United States Patent [19]

Davis et al.

[11] 4,164,919

[45] Aug. 21, 1979

[54] TANK VENT SYSTEM

[75] Inventors: Lewis K. Davis, Waterloo; Kenneth J. Lowin, Cedar Falls, both of Iowa

[73] Assignee: Deere & Company, Moline, Ill.

[21] Appl. No.: 897,357

[22] Filed: Apr. 18, 1978

Related U.S. Application Data

[63] Continuation-in-part of Ser. No. 724,546, Sep. 20, 1976, abandoned.

[51] Int. Cl.² ............................................. F02M 59/00
[52] U.S. Cl. ................................ 123/136; 123/119 C
[58] Field of Search ......................... 123/136, 119 C; 137/205.5, 564.5, 101.11; 60/605

[56] References Cited

U.S. PATENT DOCUMENTS

| 1,830,732 | 11/1931 | Almen | 123/119 C |
| 3,592,175 | 7/1971 | Hamilton | 123/119 C |
| 3,846,983 | 11/1974 | Freedy | 123/119 C |

Primary Examiner—Ronald H. Lazarus

[57] ABSTRACT

A tank vent system includes a turbo-charged internal combustion engine with accompanying fuel tank. The fuel tank is connected by conventional fuel line and fuel pump to supply fuel to the engine while the pressurized, turbo-charged air connection between the turbocharger and the engine is connected through a filter and a first orifice to the top of the fuel tank to supply filtered and pressurized air into the fuel tank as the fuel is pumped out for the engine. A second orifice between the first orifice and the fuel tank is provided to limit the pressure buildup in the fuel tank and relieve the pressure when the internal combustion engine is shut down.

6 Claims, 1 Drawing Figure

U.S. Patent  Aug. 21, 1979  4,164,919
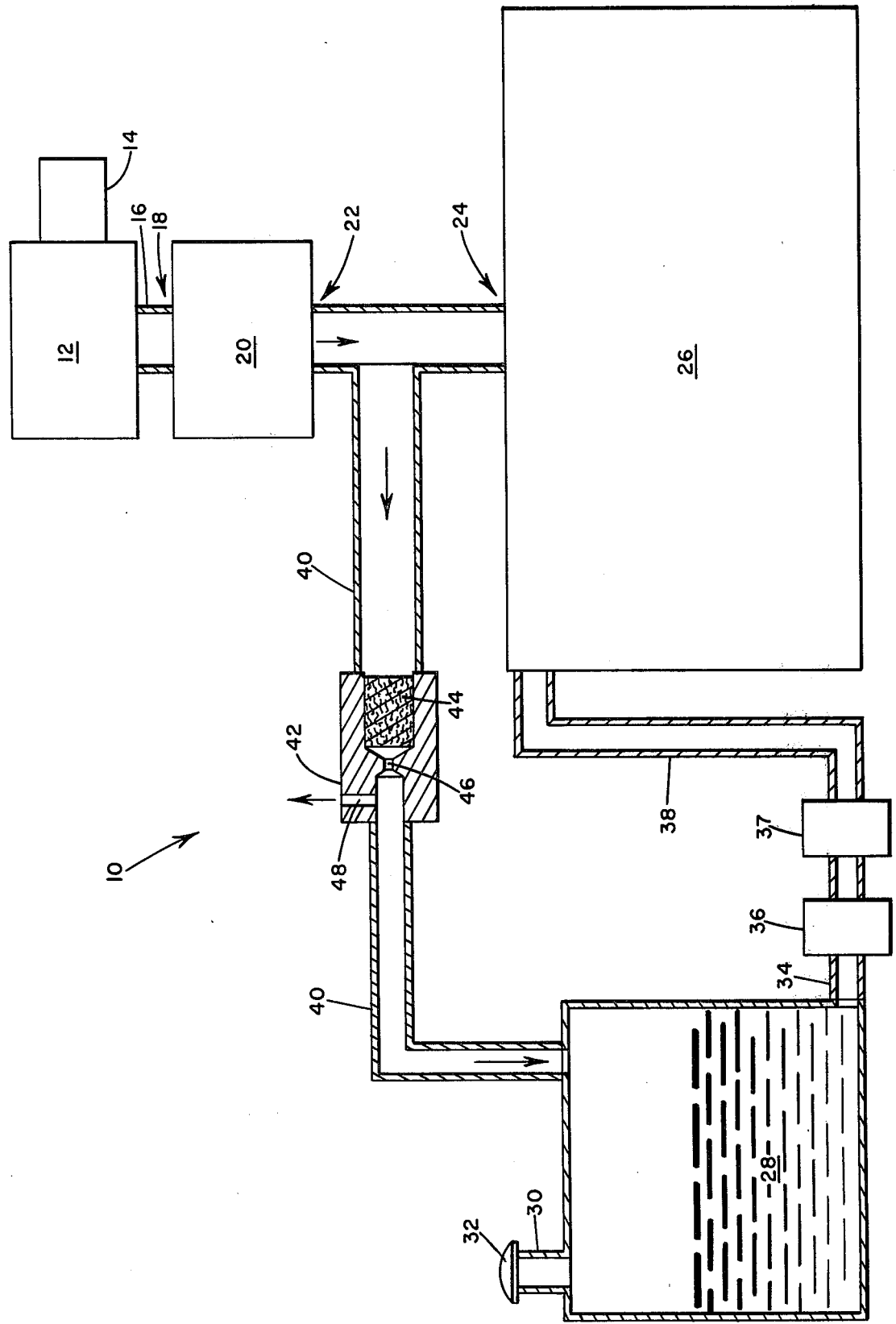

TANK VENT SYSTEM

CROSS REFERENCE TO RELATED APPLICATION

This application is a continuation-in-part of U.S. application Ser. No. 724,546 filed on 20 Sept. 1976, now abandoned.

BACKGROUND OF THE INVENTION

The present invention relates generally to venting of tanks and more particularly to a pressurized fuel tank venting system.

In the past, anti-slosh-vented fuel filter caps were utilized on fuel tanks to allow atmospheric air to enter the fuel tanks through the cap as the fuel was drawn out and utilized by the engine. Under dusty operating conditions as present with agricultural vehicles, dust would be drawn into the fuel tank along with the air and would contaminate the fuel. The dust would pass through the fuel transfer pump causing accelerated wear and then would accumulate in the fuel filter shortening filter life.

SUMMARY OF THE INVENTION

The present invention provides a system by which compressed air from the turbo-charged pressure side of the turbocharger of a turbo-charged engine is connected to a tank so as to provide a limited pressure buildup in the tank and allow the tank to be entirely sealed while the engine is in operation. This system, when used with a fuel tank, allows the fuel tank filter cap to be non-vented and sealed so as to prevent leakage from the fuel tank while air, entering the fuel tank for replacing fuel removed, is filtered through the engine air filter system. Additionally, the pressure in the fuel tank provided by the system assists the fuel transfer pump in moving fuel to the fuel injection system of the engine. Further, both the engine fuel filter life and fuel transfer pump life are extended because the fuel is kept in a much cleaner condition.

The above and additional advantages of the present invention will become apparent to those skilled in the art from a consideration of the following detailed description of the preferred embodiment when taken in conjunction with the acompanying drawing.

BRIEF DESCRIPTION OF THE DRAWING

The drawing is a schematic illustration of the pressurized tank vent system of the present invention.

DESCRIPTION OF THE PREFERRED EMBODIMENT

Referring now to the drawing, therein is shown a pressurized tank vent system which in the preferred embodiment is a fuel tank vent system generally designated by the numeral 10. The system 10 includes an engine air filter 12 having an air inlet 14 and a filtered air outlet 16 which is connected to an inlet 18 of a conventional engine-driven turbocharger 20. The turbocharger 20, which compresses or pressurizes atmospheric air, has an outlet pressure side 22 which is connected to the air inlet 24 of a conventional internal combustion engine 26.

The engine 26 is supplied with fuel from a fuel tank 28. The fuel tank 28 includes a filler portion 30 topped by a nonvented, sealed fuel filter cap 32. The fuel tank 28 is connected by a fuel line 34 to a conventional fuel transfer pump 36. The fuel transfer pump 36 is connected to a conventional fuel filter 37 and thence by a fuel line 38 to a conventional fuel injection system (not shown) in the engine 26.

The fuel tank 28 is vented by means of an air line 40, a portion of which is connected to a pressure limiting block 42 and the remainder of which is connected from the pressure limiting block 42 to the outlet pressure side 22 of the turbocharger 20. The pressure limiting block 42 contains an air filter 44 which passes filtered and pressurized air to a first orifice 46. In the pressure limiting block 42 between the first orifice 46 and the fuel tank 28 is a second orifice 48 which is open to the atmosphere.

In operation, atmospheric air is drawn through the air filter 12 by the turbocharger 20 which compresses the air and provides the compressed, pressurized air at its outlet pressure side 22. The majority of the compressed air passes to the engine 26, while a portion is diverted into the air line 40 where it passes through the filter 44. The compressed air then passes through the orifice 46 in the pressure limiting block 42 into the air line 40 and thence to the top of the fuel tank 28. The compressed air entering the fuel tank 28 pressurizes it and replaces fuel which is pumped out by the fuel transfer pump 36 to the engine 26. In addition, the pressure in the fuel tank 28 assists the fuel transfer pump 36 in moving fuel to the engine 26. In order to limit the pressure buildup in the tanks to a maximum of 10 inches of water (25 mbar) the second orifice 48 to the atmosphere has a cross-sectional area which is approximately nine times greater than that of the first orifice 46.

When the engine 26 is idling under no load such that the turbocharger 20 is not running fast enough to compress the air and the engine 26 reduces the pressure at the inlet 24 below atmospheric pressure, air will be drawn in through the second orifice 48 and filtered by the filter 44 before being drawn into the engine 26.

Since the cap 32 is non-vented and sealed, the entire pressurized fuel tank vent system 10 is sealed from contamination during operation. Thus, both engine fuel filter and fuel transfer pump life are extended because the fuel is kept in a much cleaner condition.

While the invention has been described in conjunction with a specific embodiment, it is to be understood that many alternatives, modifications, and variations will be apparent to those skilled in the art in light of the aforegoing description. The present tank vent system can be used wherever air must be exhausted or drawn into a closed tank as with transmission housings containing internal volume changing hydraulically actuated clutches or with hydraulic reservoirs feeding hydraulic cylinders or differential housings and the like which contain air and must be vented to compensate for temperature changes. Accordingly, it is intended to embrace all such alternatives, modifications, and variations which fall within the spirit and scope of the appended claims.

We claim:

1. A tank vent system comprising: an internal combustion engine; air filter means for providing filtered air to said engine; a turbocharger having an inlet side operatively connected to said air filter means and an outlet pressure side operatively connected to said engine for providing filtered and pressurized air to said engine; a fuel tank having a non-vented filler cap for containing fuel for said engine; an air line connecting the outlet pressure side of said turbo-charger to said fuel tank to cause filtered and pressurized air to replace fuel supplied to said engine; first orifice means disposed in the air line between the outlet pressure side of said turbocharger and said fuel tank restricting air flow therebetween and second orifice means connected to the air line between the first orifice means and the fuel tank to relieve air pressure in the air line whereby pressure in the fuel tank is relieved.

2. The tank vent system as claimed in claim 1 wherein the second orifice means has a cross-sectional area substantially nine times greater than the cross-sectional area of the first orifice means.

3. The tank vent system as claimed in claim 1 including filter means disposed in said passageway means between the outlet of said turbocharger and said first orifice means.

4. A tank vent system comprising: an internal combustion engine; air filter means for providing filtered air to said engine; a turbocharger having an inlet side operatively connected to said air filter means and an outlet pressure side operatively connected to said engine for providing filtered and pressurized air to said engine; a tank subject to changes in internal air volume; an air line connecting the outlet pressure side of said turbocharger to said tank to cause filtered and pressurized air to be provided to said tank to compensate for said changes in internal air volume in said tank; first orifice means disposed in the air line between the outlet pressure side of said turbocharger and said tank restricting air flow therebetween and second orifice means connected to the air line between the first orifice means and the tank to relieve air pressure in the air line whereby pressure in the tank is relieved.

5. The tank vent system as claimed in claim 4 wherein the second orifice means has a cross-sectional area substantially nine times greater than the cross-sectional area of the first orifice means.

6. The tank vent system as claimed in claim 4 including filter means disposed in said passageway means between the outlet of said turbocharger and said first orifice means.

* * * * *